United States Patent
Yang et al.

(10) Patent No.: US 7,975,096 B2
(45) Date of Patent: Jul. 5, 2011

(54) STORAGE SYSTEM HAVING MULTIPLE NON-VOLATILE MEMORIES, AND CONTROLLER AND ACCESS METHOD THEREOF

(75) Inventors: Jiunn-Yeong Yang, Keelung (TW); Chien-Hua Chu, Hsinchu County (TW); Kuo-Yi Cheng, Taipei (TW); Li-Chun Liang, Kaohsiung (TW); Chih-Kang Yeh, Kinmen County (TW)

(73) Assignee: Phison Electronics Corp., Miaoli (TW)

( * ) Notice: Subject to any disclaimer, the term of this patent is extended or adjusted under 35 U.S.C. 154(b) by 522 days.

(21) Appl. No.: 12/197,468

(22) Filed: Aug. 25, 2008

(65) Prior Publication Data
US 2009/0300271 A1    Dec. 3, 2009

(30) Foreign Application Priority Data

May 27, 2008   (TW) ................................ 97119534 A

(51) Int. Cl.
*G06F 12/00*   (2006.01)
(52) U.S. Cl. ........ 711/103; 711/149; 711/156; 711/168; 365/189.04; 365/189.14
(58) Field of Classification Search .................. 711/103, 711/149, 156, 168; 365/189.04, 189.14
See application file for complete search history.

(56) References Cited

U.S. PATENT DOCUMENTS

| | | | | |
|---|---|---|---|---|
| 5,845,332 A | * | 12/1998 | Inoue et al. | 711/163 |
| 6,725,322 B1 | * | 4/2004 | Shiraishi et al. | 711/103 |
| 7,114,117 B2 | * | 9/2006 | Tamura et al. | 714/763 |
| 7,290,109 B2 | * | 10/2007 | Horii et al. | 711/168 |
| 7,290,198 B2 | * | 10/2007 | Tamura et al. | 714/763 |
| 7,793,031 B2 | * | 9/2010 | Sartori et al. | 710/313 |

* cited by examiner

*Primary Examiner* — Stephen C Elmore
(74) *Attorney, Agent, or Firm* — J.C. Patents

(57) ABSTRACT

A non-volatile memory storage system including a transmission interface, a memory module, and a controller is provided. The memory module includes first and second non-volatile memory chips. The first and the second non-volatile memory chips can be simultaneously enabled by receiving a chip enable signal from the controller via a chip enable pin. When the controller performs a multichannel access, the controller provides an access instruction to the first and second non-volatile memory chip, after enabling the first non-volatile memory chip and the second non-volatile memory chip with the chip enable signal. When the controller performs a single channel access, the controller provides the access signal to one of the first and second non-volatile memory chips, and provides a non-access instruction to the other one, after enabling the first non-volatile memory chip and the second non-volatile memory chip with the chip enable signal.

14 Claims, 3 Drawing Sheets

STORAGE SYSTEM HAVING MULTIPLE NON-VOLATILE MEMORIES, AND CONTROLLER AND ACCESS METHOD THEREOF

CROSS-REFERENCE TO RELATED APPLICATION

This application claims the priority benefit of Taiwan application serial no. 97119534, filed on May 27, 2008. The entirety of the above-mentioned patent application is hereby incorporated by reference herein and made a part of this specification.

BACKGROUND

1. Technology Field

The present invention generally relates to a storage system, and a controller and an access method thereof, and more particularly, to a storage system having multiple non-volatile memories, and a controller and an access method thereof. The present invention is adapted for performing a multi-channel access for multiple non-volatile memory chips and performing a single channel access for a single non-volatile memory chip with less enabling signal pins.

2. Description of Related Art

With a quick development of digital camera, cell phone camera and MP3, demand of storage media by customers is increased greatly. Since a flash memory has the advantages of non-volatile, energy saving, small size and none mechanical structure etc., it is suitable for portable applications, and especially for portable battery-powered products. A memory card is storage device applying the flash memory. Since the memory card has a small sized and is easy to be carried around, it is widely used for storing important personal data. Therefore, the flash memory industry becomes a hot industry within the electronics industry recently.

To increasing a data accessing amount, a non-volatile memory module (for example, a flash memory module) of a general storage system is formed by stacking and packaging a plurality of memory chips, and the memory chips can be interleavely accessed, so that the data accessing amount within unit time is greater than that of an earlier memory module only packaged with a single memory chip.

FIG. 1 is a schematic block diagram illustrating a flash memory storage system according to the conventional technology. Referring to FIG. 1, a flash memory system 100 includes a controller 102 respectively controlling a first chip enable pin CE0, a second chip enable pin CE1, a third chip enable pin CE2, and a fourth chip enabling chip pin CE3 for enabling a first flash memory chip 104, a second flash memory chip 106, a third flash memory chip 108, and a fourth flash memory chip 110. The flash memory system 100 further includes a control bus 112 electrically connected between the controller 102, the first flash memory chip 104, the second flash memory chip 106, the third flash memory chip 108, and the fourth flash memory chip 110 for transmitting instructions. The flash memory system 100 further includes a first I/O bus 114 electrically connected between the controller 102, the first flash memory chip 104, and the third flash memory chip 108 for transmitting data, and a second I/O bus 116 electrically connected between the controller 102, the second flash memory chip 106 and the fourth flash memory chip 110 for transmitting data.

In such the flash memory chip system 100, for example when the controller 102 intends to write data into the first flash memory chip 104, the controller 102 enables the first memory chip 104 via the first chip enable pine CE0, and the first I/O bus 114 transmits the written data. When the controller 102 intends to simultaneously write data into the first flash memory chip 104 and the second flash memory chip 106, the controller enables the first flash memory chip 104 via the first chip enable pin CE0 and enables the second flash memory chip 106 via the second chip enable pin CE1, and then transmits a writing instruction to the first flash memory chip 104 and the second flash memory chip 106 by the control bus 112, and then simultaneously transmits the written data via the first I/O bus 114 and the second I/O bus 116.

According to the foregoing configuration, the conventional non-volatile memory storage system is capable of enabling a plurality of non-volatile memory chips by a plurality of chip enable pins, respectively, so as for performing a single channel access to a specific non-volatile memory chip, and meanwhile the conventional non-volatile memory storage system is also capable of performing a multi-channel access to the multiple non-volatile memory chips via a plurality of I/O buses after respectively enabling the non-volatile memory chips.

Although the conventional technology is capable of performing the single channel access or the multi-channel access to the non-volatile memory chips, this technology requires for a plurality of chip enable pins for respectively enabling multiple non-volatile memory chips, which inevitably increases the size of the non-volatile memory storage system. This is a large disadvantage for those portable memory cards which desire a small overall size. Moreover, applying of multiple chip enable pins can also increase a cost of the non-volatile memory storage system.

SUMMARY

Accordingly, the present invention is directed to provide a non-volatile memory storage system. The non-volatile memory storage system is capable of performing a multi-channel access and a single channel access to multiple non-volatile memory chips with less chip enable pins.

The present invention provides a controller, for performing an access program. The access program is adapted for performing a multi-channel access and a single channel access to multiple non-volatile memory chips with less chip enable pins.

The present invention provides an access method, which is adapted for performing a multi-channel access and a single channel access to multiple non-volatile memory chips with less chip enable pins.

The present invention provides a non-volatile memory storage system, including a transmission interface, a memory module, and a controller. The transmission is adapted for electrically connecting to a host. The memory module includes a first non-volatile memory chip and a second non-volatile memory chip. The first non-volatile memory chip and the second non-volatile memory chip can be simultaneously enabled by receiving a chip enable signal via a chip enable pin. The controller is electrically connected to the transmission interface and the memory module. When the controller performs a multi-channel access, the controller provides an access instruction to the first non-volatile memory chip and the second non-volatile memory chip after the first non-volatile memory chip and the second non-volatile memory chip are enabled with the chip enable signal. When the controller performs a single channel access, the controller provides the access signal to one of the first non-volatile memory chip and the second non-volatile memory chip, and provides a non-access instruction to the other one of the first non-volatile memory chip and the second non-volatile memory chip after the first non-volatile memory chip and the second non-volatile memory chip are enabled with the chip enable signal, wherein the non-access instruction does not change data stored in the first non-volatile memory chip and the second non-volatile memory chip.

According to an embodiment of the present invention, the non-volatile memory storage system further includes a plurality of I/O buses, and a control bus. The I/O buses are respectively electrically connected between the first non-volatile memory chip and the controller and between the second non-volatile memory chip and the controller. The control bus is connected between the first non-volatile memory chip and the second non-volatile memory chip and the controller.

According to an embodiment of the present invention, the access instruction is a writing instruction or a reading instruction.

According to an embodiment of the present invention, the non-access instruction is a status enquiry instruction.

According to an embodiment of the present invention, the first non-volatile memory chip and the second non-volatile memory chip are single level cell (SLC) NAND flash memory chips or multi-level cell (MLC) NAND flash memory chips.

According to an embodiment of the present invention, the transmission interface is a PCI Express interface, an USB interface, an IEEE 1394 interface, a SATA interface, an MS interface, an MMC interface, an SD interface, a CF interface, or an IDE interface.

The present invention provides a controller, adapted for controlling a memory module of a non-volatile memory storage system. The memory module includes a first non-volatile memory chip and a second non-volatile memory chip. The first non-volatile memory chip and the second non-volatile memory chip can be simultaneously enabled by receiving a chip enable signal via a chip enable pin at the same time. The controller includes a memory interface and a microprocessor. The microprocessor is electrically connected to the memory interface. When the controller performs a multi-channel access, the microprocessor provides an access instruction to the first non-volatile memory chip and the second non-volatile memory chip after the first non-volatile memory chip and the second non-volatile memory chip are enabled with the chip enable signal. When the microprocessor performs a single channel access, the microprocessor provides the access instruction to one of the first non-volatile memory chip and the second non-volatile memory chip, and provides a non-access instruction to the other one of the first non-volatile memory chip and the second non-volatile memory chip after the first non-volatile memory chip and the second non-volatile memory chip are enabled with the chip enable signal, wherein the non-access instruction does not change data stored in the first non-volatile memory chip and the second non-volatile memory chip.

According to an embodiment of the present invention, the access instruction is a writing instruction or a reading instruction.

According to an embodiment of the present invention, the non-access instruction is a status enquiry instruction.

According to an embodiment of the present invention, the first non-volatile memory chip and the second non-volatile memory chip are single level cell (SLC) NAND flash memory chips, or multi-level cell (MLC) NAND flash memory chips.

According to an embodiment of the present invention, the non-volatile memory storage system is a flash drive, a memory card, or a solid state drive (SDD).

The present invention provides an access method, adapted for accessing a memory module of a non-volatile memory storage system. The memory module includes a first non-volatile memory chip and a second non-volatile memory chip. The first non-volatile memory chip and the second non-volatile memory chip are adapted to be enabled by receiving a chip enable signal via a chip enable pin at the same time. The access method includes determining whether to access the first non-volatile memory chip and the second non-volatile memory chip at the same time, or access only one of the first non-volatile memory chip and the second non-volatile memory chip. The access method further includes enabling the first non-volatile memory chip and the second non-volatile memory chip with the chip enable signal, providing an access instruction to the first non-volatile memory chip and the second non-volatile memory chip and accessing data of the first non-volatile memory chip and the second non-volatile memory chip when it is determined to access the first non-volatile memory chip and the second non-volatile memory chip at the same time. The access method further includes enabling the first non-volatile memory chip and the second non-volatile memory chip with the chip enable signal, providing the access instruction to one of the first non-volatile memory chip and the second non-volatile memory chip and providing a non-access instruction to the other one of the first non-volatile memory chip and the second non-volatile memory chip and accessing data of the one of the first non-volatile memory chip and the second non-volatile memory chip when it is determined to access only one of the first non-volatile memory chip and the second non-volatile memory chip, wherein the non-access instruction does not change data stored in the first non-volatile memory chip and the second non-volatile memory chip.

According to an embodiment of the present invention, the access instruction is a writing instruction or a reading instruction.

According to an embodiment of the present invention, the non-access instruction is a status enquiry instruction.

The present invention employs a single chip enable pin for connecting multiple non-volatile memory chips, and thus being capable of providing different instructions regarding different non-volatile memory chips. And therefore, the present invention is capable of performing a multichannel access and a single channel access with less chip enable pins.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
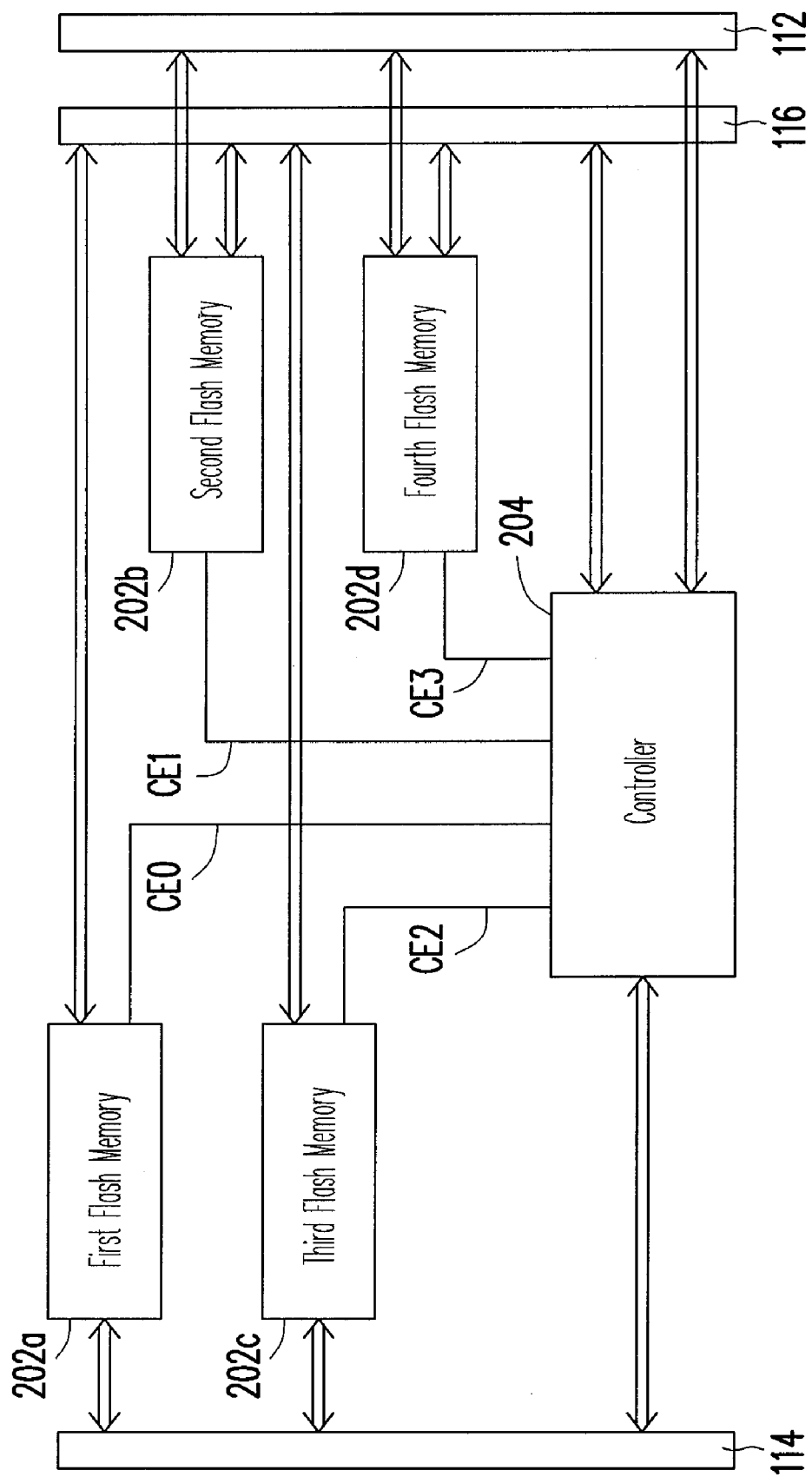
FIG. 1 is a schematic block diagram illustrating a conventional non-volatile memory storage system.

Reference will now be made in detail to the present preferred embodiments of the invention, examples of which are illustrated in the accompanying drawings. Wherever possible, the same reference counting numbers are used in the drawings and the description to refer to the same or like parts.

Figure 2:
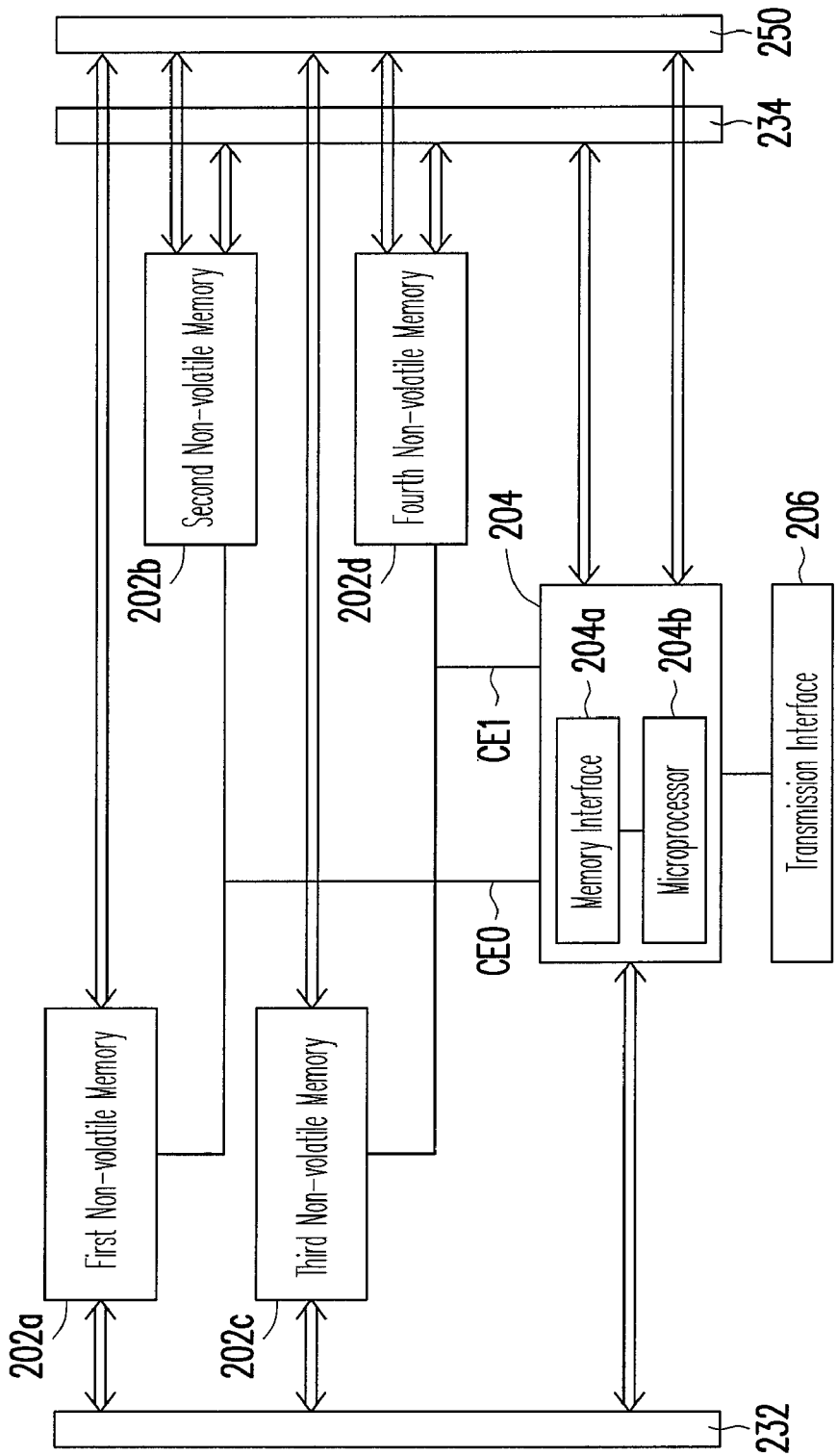
FIG. 2 is a schematic block diagram illustrating a non-volatile memory storage system according to an embodiment of the present invention.

FIG. 2 is a schematic block diagram illustrating a non-volatile memory storage system according to an embodiment of the present invention.

Referring to FIG. 2, it shows a non-volatile memory storage system 200 including a memory module, a controller 204, and a transmission interface 206. The memory module includes a first non-volatile memory chip 202a, a second non-volatile memory chip 202b, a third non-volatile memory chip 202c, and a fourth non-volatile memory chip 202d. The non-volatile memory storage system 200 is adapted for operating together with a host (not shown), for allowing the host to store data into the non-volatile memory storage system 200, or reading data from the non-volatile memory storage system 200. In the present embodiment, the non-volatile memory storage system 200 is a memory card. However, it should be noted that in another embodiment of the present invention, the non-volatile memory storage system 200 can also be a flash drive or a solid state drive (SDD).

The first non-volatile memory chip 202a, the second non-volatile memory chip 202b, the third non-volatile memory chip 202c, and the fourth non-volatile memory chip 202d are adapted for storing data. In the present embodiment, the first non-volatile memory chip 202a, the second non-volatile memory chip 202b, the third non-volatile memory chip 202c, and the fourth non-volatile memory chip 202d are single level cell (SLC) NAND flash memory chips. However, the present invention is not limited thereto, and the non-volatile memory chips can also be MLC NAND flash memory chips or other suitable non-volatile memory chips.

Further, it should be noted that, although the memory module is exemplified as including four non-volatile memory chips in the present embodiment, in fact the memory module may include any suitable number of non-volatile memory chips in other embodiments. [0035] The controller 204 is adapted for controlling an overall operation of the non-volatile memory storage system 200, such as storing, reading, and erasing of the data. The controller 204 is electrically connected to the memory module. Specifically, the controller 204 is connected to the first non-volatile memory chip 202a and the second non-volatile memory chip 202b via a first chip enable pin CE0, and is connected to the third non-volatile memory chip 202c and the fourth non-volatile memory chip 202d via a second chip enable pin CE1. The first chip enable pin CE0 and the second chip enable pin CE1 are adapted for transmitting a chip enable signal provided by the controller 204.

In details, when the controller desires to access the first non-volatile memory chip 202a, the second non-volatile memory chip 202b, the third non-volatile memory chip 202c, or the fourth non-volatile memory chip 202d, the controller 204 has to transmit the chip enable signal via the first chip enable pin CE0 or the second chip enable pin CE1 to enable the first non-volatile memory chip 202a, the second non-volatile memory chip 202b, the third non-volatile memory chip 202c, or the fourth non-volatile memory chip 202d. When the controller 204 transmits the chip enable signal via the first chip enable pin CE0, the controller 204 simultaneously enables the first non-volatile memory chip 202a and the second non-volatile memory chip 202b, and when the controller 204 transmits the chip enable signal via the second chip enable pin CE1, the controller 204 simultaneously enables the third non-volatile memory chip 202c and the fourth non-volatile memory chip 202d.

Specifically, the controller 204 includes a memory interface 204a, and a microprocessor 204b. The memory interface 204a is adapted for accessing the memory module. In other words, data to be stored in the memory module by the host will be converted into a format acceptable by the memory module by the memory interface 204a. The microprocessor 204b is electrically connected to the memory interface 204a for receiving and processing instructions provided by the host, such as writing data, reading data, and erasing data, or the like.

It should be noted that, when transmitting the chip enable signal, the controller 204 enables two non-volatile memory chips connected to one chip enable chip. As such, the microcontroller 204b of the controller 204 provides different access instructions regarding a predetermination of either performing a multi-channel access (e.g., dual channel access) or a single channel access. The single channel access represents operating only one I/O bus in one time for accessing a single non-volatile memory chip, and the multi-channel access represents operating multiple I/O buses for accessing multiple non-volatile memory chips.

Specifically, for example when the microprocessor 204b desires to perform a parallel writing (or reading) operation to the first non-volatile memory chip 202a and the second non-volatile memory chip 202b, the microprocessor 204b selects to transmit the chip enable signal via the first chip enable pin CE0 for enabling the first non-volatile memory chip 202a and the second non-volatile memory chip 202b, and then provide a writing (or reading) instruction to the first non-volatile memory chip 202a and the second non-volatile memory chip 202b at the same time. Further, when the microprocessor 204b desires to perform a single writing (or reading) operation to the first non-volatile memory chip 202a, the microprocessor 204b selects to transmit the chip enable signal via the first chip enable pin CE0 for enabling the first non-volatile memory chip 202a, and then provides a writing (or reading) instruction to the first non-volatile memory chip 202a. However, when the first non-volatile memory chip 202a is enabled, the second non-volatile memory chip 202b is also enabled at the same time. As such, the microprocessor 204b provides a non-access instruction to the second non-volatile memory chip 202b which does not change the data stored therein. According to the present embodiment, the non-access instruction is a reset instruction, which is adapted for resetting the non-volatile memory chip without performing any writing or reading operation thereto. According to another embodiment, the non-access instruction may also be a status enquiry instruction, or any instruction which does not change an inner value of the non-volatile memory chip.

Further, although not shown in the drawings of the present embodiment, the controller 204 may further include functional modules such as a memory management module, a buffer memory, and a power management module, which are well established in a normal flash memory controller.

The transmission interface 206 is adapted for connecting with the host. In the present embodiment, the transmission interface 206 is an SD interface. However, it should be noted that the transmission interface 206 can also be a PCI Express interface, an IEEE 1394 interface, a SATA interface, an MS interface, an MMC interface, a USB interface, a CF interface, an IDE interface, or any other suitable data transmission interface.

According to an embodiment of the present invention, the non-volatile memory storage system 200 further includes a first I/O bus 232, a second I/O bus 234, and a control bus 250. The first I/O bus 232, and the second I/O bus 234 are adapted for executing instructions and transmitting data accessed by the controller 204 in a way compatible to a transmission protocol together with the control bus 250. The first I/O bus 232 is connected between the first non-volatile memory chip 202a, the third non-volatile memory chip 202c, and the controller 204. The second I/O bus 234 is connected between the second non-volatile memory chip 202b, the fourth non-volatile memory chip 202d, and the controller 204.

In the present embodiment, the control bus 250 includes a RE (read enable) pin, a WE (write enable) pin, a CLE (command latch enable) pin, an ALE (address latch enable), a WP (write protect) pin, and an RIB (ready/busy output) pin. The control bus 250 is connected between the first non-volatile memory chip 202a, the second non-volatile memory chip 202b, the third non-volatile memory chip 202c, the fourth non-volatile memory chip 202d, and the controller 204, for executing instructions and transmitting data accessed by the controller 204 in a way compatible to a transmission protocol together with the I/O buses.

Figure 3:
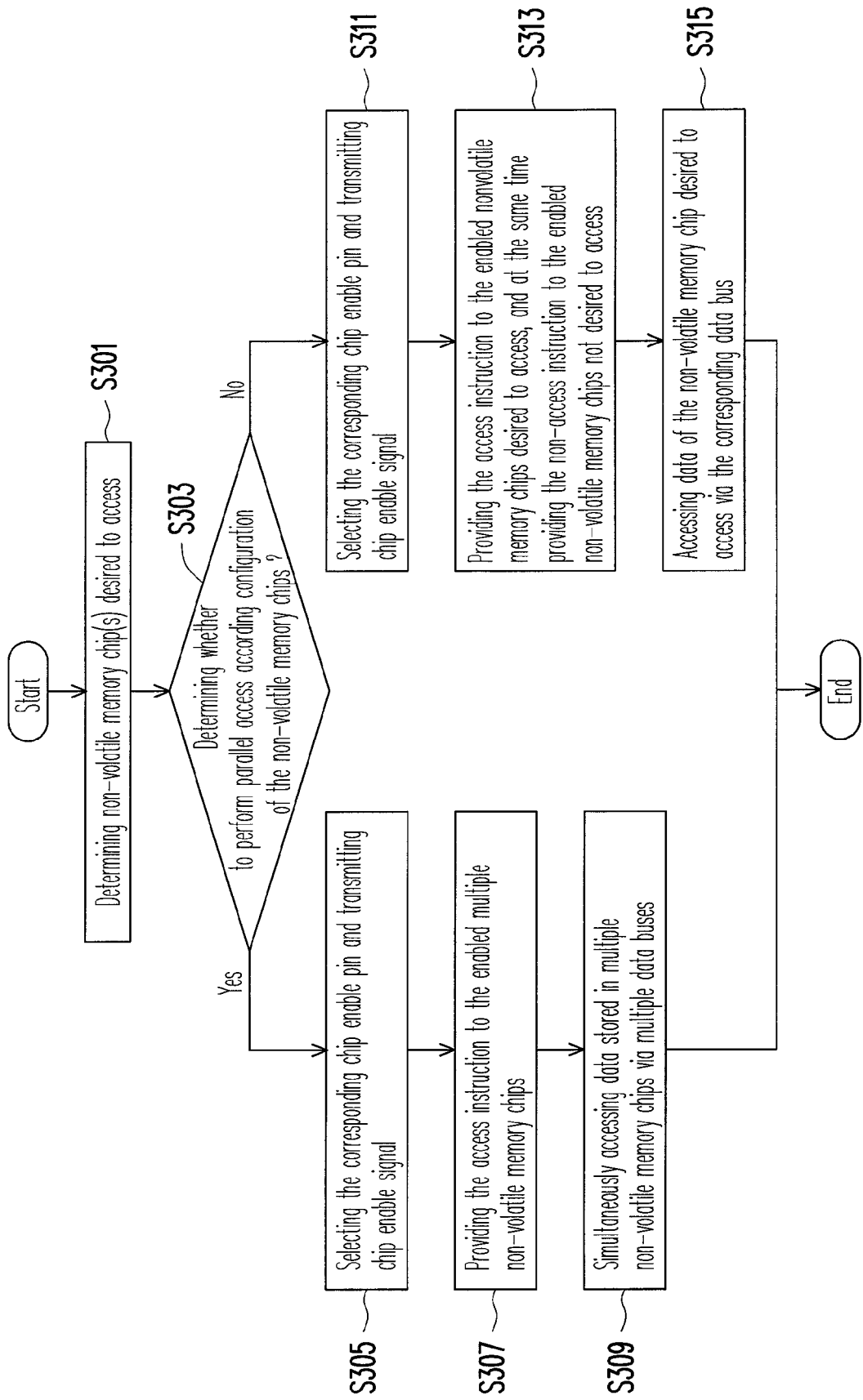
FIG. 3 is a flow chart illustrating an access method according to an embodiment of the present invention.

FIG. 3 is a flow chart illustrating an access method according to an embodiment of the present invention.

Referring to FIG. 3, when the host desires to perform an access (i.e., writing or reading instruction) to the non-volatile memory storage system 200, at step S301, the microprocessor 204b determines one or more of the non-volatile memory chips desired to access. Then, at step S303, it is determined whether to perform a multi-channel access according to a configuration of the non-volatile memory chips.

If it is determined to perform the multi-channel access (e.g., a dual channel access to the third non-volatile memory chip 202c and the fourth non-volatile memory chip 202d) at step S303, then at step S305, a corresponding chip enable pin (e.g., the chip enable pin CE1) is selected for transmitting the chip enable signal. Then, at step S307, the microprocessor 204b provides an access instruction to the enabled multiple non-volatile memory chips (e.g., the third non-volatile memory chip 202c and the fourth non-volatile memory chip 202d). Finally, at step S309, data of the multiple non-volatile memory chips are accessed at the same time via multiple I/O buses, for example transmitting accessed data of the third non-volatile memory chip 202c via the first I/O bus 232, and transmitting accessed data of the fourth non-volatile memory chip 202d via the second I/O bus 234.

However, if it is determined not to perform the multi-channel access (e.g., determining to perform a single access to the first non-volatile memory chip 202a) at step S303, then at step S311, a corresponding chip enable pin (e.g., the chip enable pin CE0) is selected for transmitting the chip enable signal. Then, at step S313, the microprocessor 204b provides an access instruction to the enabled non-volatile memory chip (e.g., the first non-volatile memory chip 202a) which is desired to access, and at the same time provides a non-access instruction to the enabled non-volatile memory (e.g., the second non-volatile memory chip 202b) which is not desired to access. Finally, at step S315, data of the non-volatile memory chip which is desired to access is accessed via a corresponding I/O bus, for example transmitting accessed data of the first non-volatile memory chip 202a via the first I/O bus 232.

In summary, the present invention employs a single chip enable pin for connecting multiple non-volatile memory chips, for saving chip enable pins and miniaturizing the volume of the non-volatile memory storage system. Further, the microprocessor is adapted for providing equivalent access instructions to simultaneously enabled non-volatile memory chips for allowing the non-volatile memory storage system to perform a multichannel access. The microprocessor is also adapted for providing an access instruction to a specific non-volatile memory chip and providing a non-access instruction to another non-volatile memory chip (e.g., a reset instruction) for allowing the non-volatile memory storage system to perform a single channel access under a configuration of one chip enable pin connecting multiple non-volatile memory chips.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A non-volatile memory storage system, comprising:
a transmission interface, adapted for coupling to a host;
a memory module, comprising a first non-volatile memory chip and a second non-volatile memory chip, wherein the first non-volatile memory chip and the second non-volatile memory chip are simultaneously enabled by receiving a chip enable signal via a chip enable pin; and
a controller, electrically connected to the transmission interface and the memory module,
wherein when the controller performs a multi-channel access, the controller provides an access instruction to the first non-volatile memory chip and the second non-volatile memory chip after the first non-volatile memory chip and the second non-volatile memory chip are enabled with the chip enable signal, and
when the controller performs a single channel access, the controller provides the access instruction to one of the first non-volatile memory chip and the second non-volatile memory chip and provides a non-access instruction to the other one of the first non-volatile memory chip and the second non-volatile memory chip after the first non-volatile memory chip and the second non-volatile memory chip are enabled with the chip enable signal, wherein the non-access instruction does not change data stored in the first non-volatile memory chip and the second non-volatile memory chip.

2. The non-volatile memory storage system according to claim 1, further comprising:
a plurality of I/O buses, respectively electrically connected between the first non-volatile memory chip and the controller, and between the second non-volatile memory chip and the controller; and
a control bus, electrically connected among the first non-volatile memory chip, the second non-volatile memory chip and the controller.

3. The non-volatile memory storage system according to claim 1, wherein the access instruction is a writing instruction or a reading instruction.

4. The non-volatile memory storage system according to claim 1, wherein the non-access instruction is a status enquiry instruction.

5. The non-volatile memory storage system according to claim 1, wherein the first non-volatile memory chip and the second non-volatile memory chip are single level cell (SLC) NAND flash memory chips or multi-level cell (MLC) NAND flash memory chips.

6. The non-volatile memory storage system according to claim 1, wherein the transmission interface is a PCI Express interface, an USB interface, an IEEE 1394 interface, a SATA interface, an MS interface, an MMC interface, an SD interface, a CF interface, or an IDE interface.

7. A controller, adapted for controlling a memory module of a non-volatile memory storage system, wherein the memory module comprises a first non-volatile memory chip and a second non-volatile memory chip and the first non-volatile memory chip and the second non-volatile memory chip are enabled by receiving a chip enable signal via a chip enable pin at the same time, the controller comprising:

a memory interface, adapted for accessing the memory module;

a microprocessor, electrically connected to the memory interface, wherein when the controller performs a multi-channel access, the microprocessor provides an access instruction to the first non-volatile memory chip and the second non-volatile memory chip after the first non-volatile memory chip and the second non-volatile memory chip are enabled with the chip enable signal; and when the microprocessor performs a single channel access, the microprocessor provides the access instruction to one of the first non-volatile memory chip and the second non-volatile memory chip and provides a non-access instruction to the other one of the first non-volatile memory chip and the second non-volatile memory chip after the first non-volatile memory chip and the second non-volatile memory chip are enabled with the chip enable signal, wherein the non-access instruction does not change data stored in the first non-volatile memory chip and the second non-volatile memory chip.

8. The controller according to claim 7, wherein the access instruction is a writing instruction or a reading instruction.

9. The controller according to claim 7, wherein the non-access instruction is a status enquiry instruction.

10. The controller according to claim 7, wherein the first non-volatile memory chip and the second non-volatile memory chip are single level cell (SLC) NAND flash memory chips or multi-level cell (MLC) NAND flash memory chips.

11. The controller according to claim 7, wherein the non-volatile memory storage system is a flash drive, a memory card, or a solid state drive (SDD).

12. An access method, adapted for accessing a memory module of a non-volatile memory storage system, the memory module comprising a first non-volatile memory chip and a second non-volatile memory chip, and the first non-volatile memory chip and the second non-volatile memory chip being adapted to be enabled by receiving a chip enable signal via a chip enable pin at the same time, the access method comprising:

determining whether to access the first non-volatile memory chip and the second non-volatile memory chip at the same time, or access only one of the first non-volatile memory chip and the second non-volatile memory chip;

enabling the first non-volatile memory chip and the second non-volatile memory chip with the chip enable signal, providing an access instruction to the first non-volatile memory chip and the second non-volatile memory chip and accessing data of the first non-volatile memory chip and the second non-volatile memory chip upon the determining to access the first non-volatile memory chip and the second non-volatile memory chip at the same time; and enabling the first non-volatile memory chip and the second non-volatile memory chip with the chip enable signal, providing the access instruction to one of the first non-volatile memory chip and the second non-volatile memory chip, providing a non-access instruction to the other one of the first non-volatile memory chip and the second non-volatile memory chip and accessing data of the one of the first non-volatile memory chip and the second non-volatile memory chip upon the determining to access only one of the first non-volatile memory chip and the second non-volatile memory chip, wherein the non-access instruction does not change data stored in the first non-volatile memory chip and the second non-volatile memory chip.

13. The access method according to claim 12, wherein the access instruction is a writing instruction or a reading instruction.

14. The access method according to claim 12, wherein the non-access instruction is a status enquiry instruction.

* * * * *